(12) United States Patent
Khan et al.

(10) Patent No.: US 10,416,900 B2
(45) Date of Patent: Sep. 17, 2019

(54) TECHNOLOGIES FOR ADDRESSING DATA IN A MEMORY

(71) Applicant: Intel Corporation, Santa Clara, CA (US)

(72) Inventors: Jawad B. Khan, Cornelius, OR (US); Vinodh Gopal, Westborough, MA (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 15/198,015

(22) Filed: Jun. 30, 2016

(65) Prior Publication Data

US 2018/0004434 A1   Jan. 4, 2018

(51) Int. Cl.
*G06F 3/06* (2006.01)

(52) U.S. Cl.
CPC ............ *G06F 3/0613* (2013.01); *G06F 3/061* (2013.01); *G06F 3/064* (2013.01); *G06F 3/068* (2013.01); *G06F 3/0659* (2013.01); *G06F 3/0685* (2013.01)

(58) Field of Classification Search
CPC ..... G06F 3/0613; G06F 3/0659; G06F 3/0685
USPC ........................................................ 711/154
See application file for complete search history.

(56) References Cited

U.S. PATENT DOCUMENTS

| 5,815,649 A * | 9/1998 | Utter .................. G06F 11/2071 709/215 |
| 6,804,698 B1 * | 10/2004 | Richards ............ H04Q 11/0478 370/391 |
| 6,912,641 B2 | 6/2005 | Chen et al. |
| 6,970,457 B1 * | 11/2005 | Richards ............. H04L 12/5602 370/382 |
| 7,380,059 B2 | 5/2008 | Burton |
| 8,725,982 B2 | 5/2014 | Tene et al. |
| 8,832,034 B1 * | 9/2014 | Ramarao ........... G06F 16/1748 707/664 |
| 9,697,219 B1 * | 7/2017 | Wang .................. G06F 16/1734 |
| 2006/0168392 A1 | 7/2006 | Hwang |
| 2014/0237163 A1 * | 8/2014 | Maharana ........... G06F 12/0871 711/103 |
| 2016/0041906 A1 * | 2/2016 | Mukherjee ............ G06F 16/221 711/119 |
| 2017/0017571 A1 * | 1/2017 | Choi .................... G06F 16/2365 |

OTHER PUBLICATIONS

International search report for PCT application No. PCT/US2017/035201, dated Aug. 25, 2017 (3 pages).
Written opinion for PCT application No. PCT/US2017/035201, dated Aug. 25, 2017 (14 pages).

* cited by examiner

*Primary Examiner* — Mohamed M Gebril
(74) *Attorney, Agent, or Firm* — Barnes & Thornburg LLP

(57) ABSTRACT

Technologies for addressing data in a memory include an apparatus that includes a memory and a controller. The memory is to store sub-blocks of data in a data table and a pointer table of locations of the sub-blocks in the data table. The controller is to manage the storage and lookup of data in the memory. Further, the controller is to store a sub-block pointer in the pointer table to a location of a sub-block in the data table and store a second pointer that references an entry where the sub-block pointer is stored in the pointer table.

18 Claims, 10 Drawing Sheets

TECHNOLOGIES FOR ADDRESSING DATA IN A MEMORY

BACKGROUND

Search and replace operations are common on computers in many applications, including office applications and databases, as well as on servers used for web searches. Given that the entire data set to be searched is read from a storage device into memory before the set is searched by the CPU, these operations are generally bandwidth intensive, CPU intensive, and time intensive. For example, in a database search/select operation, a significant amount of data is read from the storage device to system memory before the CPU performs the search. The CPU then compares the entire data set against a value or a range of values, and only matching entries are kept while the rest are discarded.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
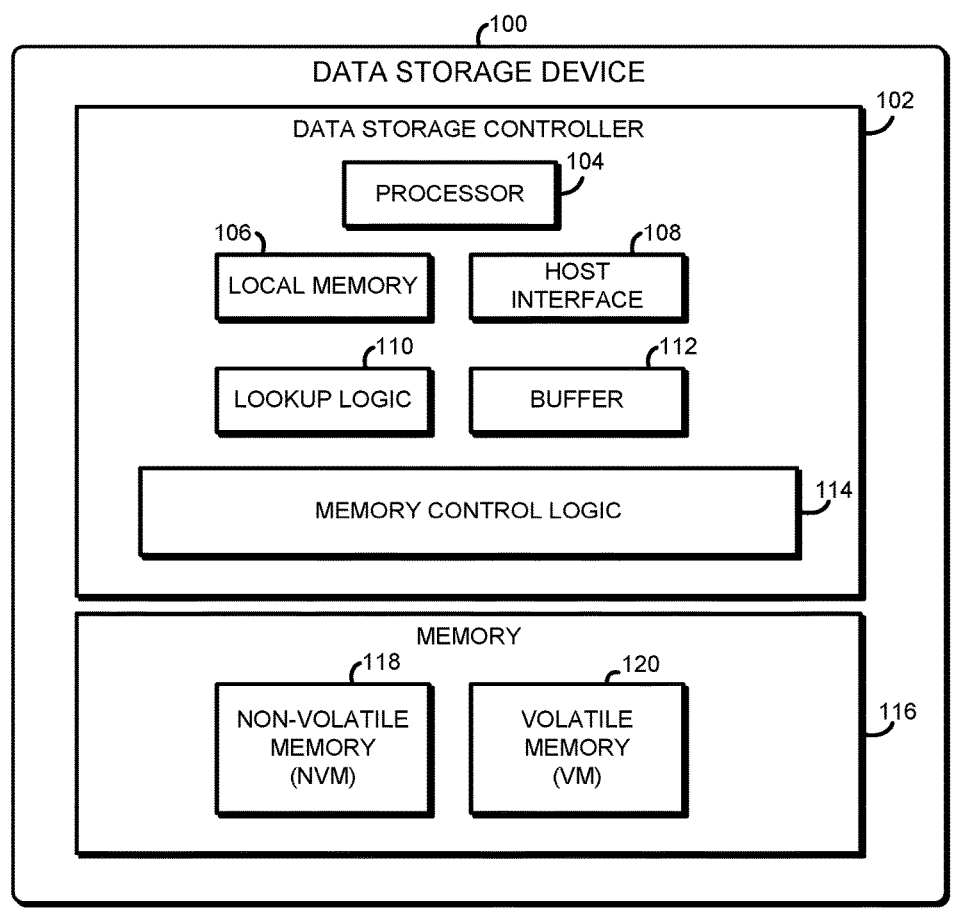
FIG. 1 is a simplified block diagram of at least one embodiment of a data storage device for storing and efficiently locating data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative data storage device 100 for storing and efficiently locating data includes a data storage controller 102 and a memory 116, which illustratively includes non-volatile memory 118 and volatile memory 120. As discussed in more detail below, in use, the data storage controller 102 is configured to store data to the memory 116 using a process that enables the data storage controller 102 to efficiently locate and potentially replace the data at a later time. In the illustrative embodiment, the data storage controller 102 is configured to partition a block of data into multiple sub-blocks and store the sub-blocks in a data table (referred to herein as a "deduplication data table") such that every sub-block is unique. The data storage controller 102 additionally generates a pointer table that indicates where every sub-block of each block is located in the deduplication data table. For duplicate sub-blocks, multiple pointers in the pointer table point to the same sub-block stored in the deduplication data table. To enable efficient searching for blocks that contain a particular sub-block (e.g., search data), the data storage controller 102 generates and maintains a linked list of pointers within the pointer table wherein the pointers in the linked list all point to the same sub-block in the deduplication data table. The sub-blocks are stored in the deduplication data table at locations determined based on the data in the sub-blocks (e.g., based on a hash of the data). Each location in the deduplication data table has an associated pointer back to the linked list of pointers in the pointer table. Accordingly, once the data storage controller 102 has located a particular sub-block in the deduplication data table, based on a hash of the data, the data storage controller 102 may access and traverse the linked list of pointers to identify every block of data that includes that particular sub-block. Additionally, the data storage controller 102 may quickly replace the data of the sub-block and update the linked list of pointers accordingly. As a result, the data storage controller 102 enables search and replace operations to occur much more efficiently in terms of bandwidth and processor usage as compared to conventional systems.

The data storage device 100 may be embodied as any type of device capable of storing data and performing the functions described herein. In the illustrative embodiment, the data storage device 100 is embodied as a solid state drive; however, in other embodiments, the data storage device 100 may embodied as other storage devices such as a hard disk drive, a memory module device, a cache memory device, and/or other data storage device.

The data storage controller 102 of the data storage device 100 may be embodied as any type of control device, circuitry, or collection of hardware devices capable of writing, reading, locating, and replacing data in the non-volatile memory 118. In the illustrative embodiment, the data storage controller 102 includes a processor or processing circuitry 104, local memory 106, a host interface 108, lookup logic 110, a buffer 112, and memory control logic 114. Of course, the data storage controller 102 may include additional devices, circuits, and/or components commonly found in a drive controller of a solid state drive in other embodiments.

The processor 104 may be embodied as any type of processor capable of performing the functions described herein. For example, the processor 104 may be embodied as a single or multi-core processor(s), digital signal processor, Field Programmable Gate Arrays (FPGA), microcontroller, or other processor or processing/controlling circuit. Similarly, the local memory 106 may be embodied as any type of volatile and/or non-volatile memory or data storage capable of performing the functions described herein. In the illustrative embodiment, the local memory 106 stores firmware and/or other instructions executable by the processor 104 to perform the described functions of the data storage controller 102. In some embodiments, the processor 104 and the local memory 106 may form a portion of a System-on-a-Chip (SoC) and be incorporated, along with other components of the data storage controller 102, onto a single integrated circuit chip.

The host interface 108 may also be embodied as any type of hardware processor, processing circuitry, input/output circuitry, and/or collection of components capable of facilitating communication of the data storage device 100 with a host device or service (e.g., a host application). That is, the host interface 108 embodies or establishes an interface for accessing data stored on the data storage device 100 (e.g., stored in the memory 116). To do so, the host interface 108 may be configured to utilize any suitable communication protocol and/or technology to facilitate communications with the data storage device 100 depending on the type of data storage device. For example, the host interface 108 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

In the illustrative embodiment, the lookup logic 110 is embodied as dedicated circuitry and/or device configured to facilitate locating sub-blocks of data stored in the memory 116, including calculating hashes of the sub-blocks to determine their locations in the deduplication data table, comparing search data to sub-block data, as well as locating and traversing the linked list of pointers that point to a particular sub-block in the deduplication data table. The lookup logic 110 may be embodied as a co-processor, an application specific integrated circuit (ASIC), or other dedicated circuitry or device. In such embodiments, the lookup logic 110 provides a hardware accelerated implementation of the search-related operations described herein. In other embodiments, at least a portion of the lookup logic 110 may be embodied as firmware or other processor-executable instructions.

The buffer 112 of the data storage controller 102 is embodied as volatile memory used by the data storage controller 102 to temporarily store data that is being read from or written to the memory 116. The particular size of the buffer 112 may be dependent on the total storage size of the memory 116. The memory control logic 114 is illustrative embodied as hardware circuitry and/or one or more devices configured to control the read/write access to data at particular storage locations of memory 116.

The non-volatile memory 118 may be embodied as any type of data storage capable of storing data in a persistent manner (even if power is interrupted to non-volatile memory 118). For example, in the illustrative embodiment, the non-volatile memory 118 is embodied as one or more non-volatile memory devices. The non-volatile memory devices of the non-volatile memory 118 are illustratively embodied as byte-addressable, write-in-place non-volatile memory devices. However, in other embodiments, the non-volatile memory 118 may be embodied as any combination of memory devices that use chalcogenide phase change material (e.g., chalcogenide glass), three-dimensional (3D) crosspoint memory, or other types of byte-addressable, write-in-place non-volatile memory, ferroelectric random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

The volatile memory 120 may be embodied as any type of data storage capable of storing data while power is supplied to the volatile memory 120. For example, in the illustrative embodiment, the volatile memory 120 is embodied one or more volatile memory devices, and is periodically referred to hereinafter as volatile memory 120 with the understanding that the volatile memory 120 may be embodied as other types of non-persistent data storage in other embodiments. The volatile memory devices of the volatile memory 120 are illustratively embodied as dynamic random-access memory (DRAM) devices, but may be embodied as other types of volatile memory devices and/or memory technologies capable of storing data while power is supplied to volatile memory 120.

Figure 2:
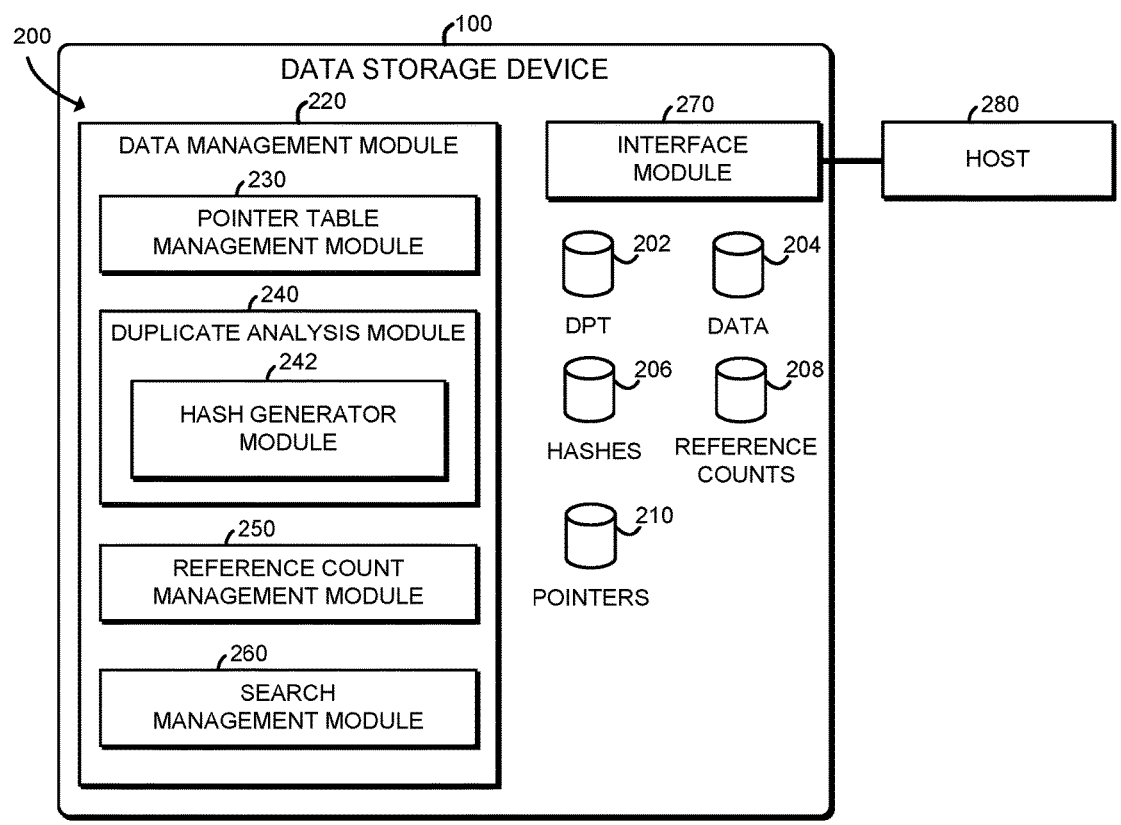
FIG. 2 is a simplified block diagram of at least one embodiment of an environment that may be established by the data storage device of FIG. 1.

Referring now to FIG. 2, in use, the data storage device 100 may establish an environment 200. The illustrative environment 200 includes a data management module 220 and an interface module 270. Each of the modules and other components of the environment 200 may be embodied as firmware, software, hardware, or a combination thereof. For example the various modules, logic, and other components of the environment 200 may form a portion of, or otherwise be established by, the data storage controller 102 or other hardware components of the data storage device 100. As such, in some embodiments, any one or more of the modules of the environment 200 may be embodied as a circuit or collection of electrical devices (e.g., a data management circuit 220, an interface circuit 270, etc.). In the illustrative embodiment, the environment 200 includes the data pointer table 202 which includes a set of pointers (also referred to herein as "sub-block pointers") to sub-blocks in the deduplication data table. The environment 200 additionally includes data 204, which includes the deduplication data table and the sub-blocks organized therein. Further, the environment 200 includes hashes 206 which are calculated from the content of an input set of data, such as a sub-block. As described in more detail herein, the sub-blocks are stored at locations in the data pointer table based at least in part on a hash 206 of the sub-block. This scheme is referred to herein as hash-based indexing. Additionally, the illustrative environment 200 includes reference counts 208 which are values that indicate how many pointers in the data pointer table 202 refer to a particular sub-block in the deduplication data table 204 at any given time. Additionally, the illustrative environment 200 includes pointers 210, which include pointers from the deduplication data table 204 to the data pointer table 202, as well as forward and backward pointers of linked lists that track which pointers within the data pointer table 202 are associated with a particular sub-block stored in the deduplication data table 204. Each of the data pointer table 202, the data 204, the hashes 206, the reference counts 208, and the pointers 210 may be accessed by the various modules and/or sub-modules of the data storage controller 102.

The data management module 220, which may be embodied as hardware, firmware, software, virtualized hardware, emulated architecture, and/or a combination thereof as discussed above, is configured to manage the writing, reading, searching, and replacing of data in the memory 116. To do so, the data management module 220 includes a pointer table management module 230, a duplicate analysis module 240, a reference count management module 250, and a search management module 260. In the illustrative embodiment, the pointer table management module 230 is configured to store pointers in the data pointer table 202 to physical addresses within the deduplication data table 204 where each sub-block of a block is stored. In response to a read request, the pointer table management module 230 is configured to traverse the pointers in the data pointer table associated with a given block to be read from the memory 116 to identify the locations (i.e., physical addresses) in the deduplication data table 204 where every sub-block of the data block is stored. Accordingly, the data block may be reassembled in response to the read request.

The duplicate analysis module 240 is configured to determine whether a given sub-block is a duplicate of (e.g., contains the same data) another sub-block that has already been stored in the deduplication data table 204. To do so, in the illustrative embodiment, the duplicate analysis module 240 includes a hash generator module 242. The hash generator module 242 is configured to analyze an input data set, such as a data sub-block and generate a hash such as one or more values representative of the data in the sub-block. Given that, in the illustrative embodiment, the deduplication data table 204 uses hash-based indexing, the duplicate analysis module 240 is configured to use the hash generated by the hash generator module 242 to locate a sub-block stored the deduplication data table 204 at a location that is based on the hash, and compare the actual data of the stored sub-block to the input data set (i.e., an input sub-block to be written to the deduplication data table 204), rather than examining every sub-block stored in the entire deduplication data table 204 to identify a duplicate. More specifically, in hash-based indexing, at least a portion of the computed hash acts as an address range (i.e., a pointer) and this address range has several locations (i.e., entries) in which that data sub-block may be stored in the deduplication data table 204. In at least some embodiments, each stored address range (i.e., pointer) may include bits that indicate which entry in the address range contains the exact data of the stored data sub-block. If all entries become full, the last entry may point to an extra location that contains the data of the data sub-block. When determining whether a particular sub-block to be written to the non-volatile memory is a duplicate of a previously-stored sub-block, the duplicate analysis module 240 may be configured to access the data sub-blocks, if any, stored in respective entries in the physical address range indicated by the hash and perform a bit-by-bit or byte-by-byte comparison of the particular sub-block to each previously-stored sub-block.

The reference count management module 250 is configured to selectively set, increase, or decrease the reference counts 208 associated with the sub-blocks stored in the deduplication data table 204. The reference counts 208 indicate the number of pointers in the data pointer table 202 that presently point to the sub-block. For example, when a data sub-block is initially stored in a data table 218 and the data sub-block is not a duplicate of another data sub-block, the reference count management module 250 is configured to set the reference count for that sub-block to one, which indicates that only one pointer in the data pointer table 202 points to that sub-block. If a later-stored sub-block is a duplicate of the earlier-stored data sub-block, the reference count management module 250 is configured to increment the reference count 208 for that already-stored sub-block in the deduplication data table 204. Similarly, if the number of pointers in the data pointer table 202 decreases, the reference count management module 250 is configured to decrease the reference count for that sub-block correspondingly. A reference count of zero indicates that the corresponding location in the deduplication data table 204 is presently unused and is available for storage of a new data sub-block.

The search management module 260 is configured to generate a linked list of pointers in the data pointer table that refer to a particular sub-block in the data pointer table. In the illustrative embodiment, the search management module 260 is configured to maintain a separate linked list for each sub-block stored in the deduplication data table 204. Further, the search management module is configured to store a pointer in association with each sub-block in the data deduplication table that refers back to the beginning of the linked list (i.e., the first pointer in the data pointer table 202) for that sub-block. In the illustrative embodiment, the search management module 260 is configured to update the corresponding linked list each time a pointer is added to or removed from the data pointer table 202. Further, the search management module 260 is configured to obtain search data (e.g., an input sub-block), determine whether a matching sub-block exists in the deduplication data table 204, such as by utilizing the duplicate analysis module 240 perform an analysis of whether a duplicate exists (i.e., a matching sub-block) of the input search data, and if a match (i.e., a duplicate) is found, traverse the corresponding linked list of pointers in the data pointer table 202 to identify every data block that includes the matching sub-block. In the illustrative embodiment, the search management module 260 is also configured to identify replacement data associated with a replace request, write the replacement data to the data pointer table as a new sub-block, unless it is a duplicate of an existing sub-block, and update the pointers in the data pointer table and the linked list to be based on the replacement data (i.e., the new sub-block) instead of the search data (i.e., the original sub-block).

It should be appreciated that each of the pointer table management module 230, the duplicate analysis module 240, the hash generator module 242, the reference count management module 250, and the search management module 260 may be separately embodied as hardware, firmware, software, virtualized hardware, emulated architecture, and/or a combination thereof. For example, the pointer table management module 230 may be embodied as a hardware component, while the duplicate analysis module 240, the hash generator module 242, the reference count management module 250, and the search management module 260 are embodied as virtualized hardware components or as some other combination of hardware, firmware, software, virtualized hardware, emulated architecture, and/or a combination thereof.

The interface module 270, which may be embodied as hardware, firmware, software, virtualized hardware, emulated architecture, and/or a combination thereof as discussed above, is configured to handle various instructions, including but not limited to, data storage instructions, data read instructions, data trimming instructions, data search instructions, and data replacement instructions received from a host 280, which may be embodied as an application, service, and/or other device. In some embodiments, the interface module 270 may be configured to handle other instructions as well, including self-monitoring, analysis and reporting technology ("SMART") instructions, and other instructions defined in the non-volatile memory express ("NVMe") specification. To handle the various instructions, the interface module 270 is configured to identify a received instruction and any data and/or parameters associated with the instruction, and transmit those items to the data management module 220. In the illustrative embodiment, in response to a search request, the interface module 270 is configured to provide, to the host 280, identifiers of the blocks that contain the matching sub-block. The interface module 270 may additionally be configured to provide acknowledgements and/or success or failure messages to the host 280 in response to requests.

Figure 3:
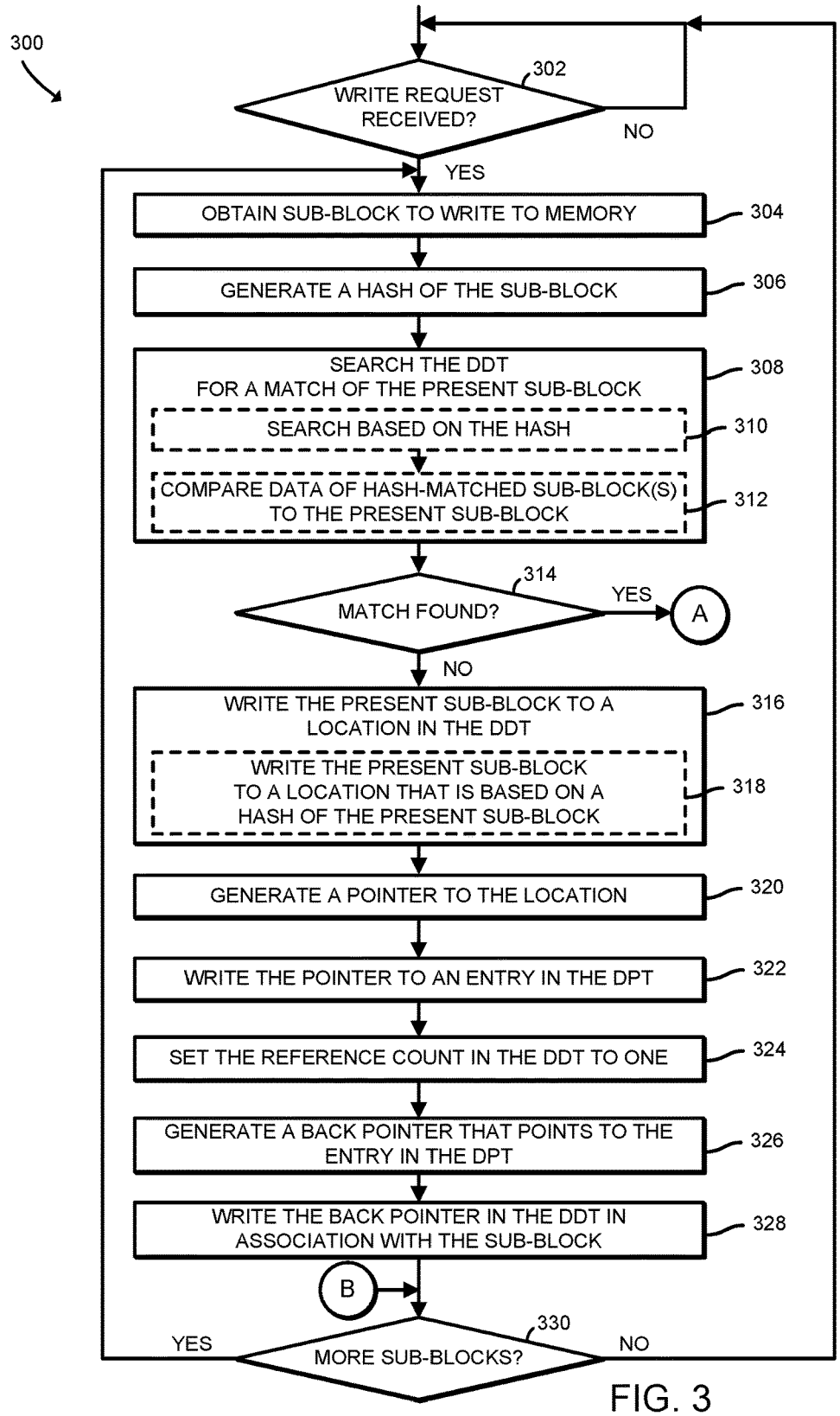
FIGS. 3-4 are a simplified flow diagram of at least one embodiment of a method for writing data to enable efficient searching of the data that may be executed by the data storage device of FIGS. 1 and 2.

Referring now to FIG. 3, in use, the data storage controller 102 of the data storage device 100 may execute a method 300 for performing a write operation that enables efficient searching of data. The method begins at block 302 in which the data storage controller 102 determines whether a write instruction has been received from the host 280. If so, the method 300 advances to block 304 in which the data storage controller 102 obtains a sub-block of a data block to be written to the memory 116, such as by reading a 64 byte set of data from a memory address associated with the write request. Otherwise, the method 300 loops back to block 302 in which the data storage controller 102 continues to wait for a write request from the host 280.

In block 306, the data storage controller 102 generates a hash of the sub-block. Subsequently, in block 308, the data storage controller 102 searches the deduplication data table 204 for a match of the present sub-block (i.e., the sub-block obtained in block 304). In doing so, in the illustrative embodiment, the data storage controller 102 searches the deduplication data table 204 for a match based on the hash generated in block 306. As described above, the hash is indicative of the underlying data in the sub-block and influences the location where the sub-block is stored in the data deduplication table. Accordingly, in the illustrative embodiment, the data storage controller 102 accesses one or more sub-blocks stored at locations in the deduplication data table 204 that are associated with the hash and compares the actual data of each sub-block to the present sub-block to determine whether a match exists, as indicated in block 312. In block 314, the data storage controller 102 determines whether a match was found. If not, the method 300 advances to block 316, in which the data storage controller 102 writes the present sub-block to a location in the deduplication data table 204. In doing so, as indicated in block 318, the data storage controller 102 may write the present sub-block to a location in the deduplication data table 204 that is based on the hash of the present sub-block, such as by using the hash-based indexing scheme described above.

In block 320, the data storage controller 102 generates a pointer to the location in the deduplication data table 204 where the present sub-block was written. Subsequently, in block 322, the data storage controller 102 writes the pointer to the data pointer table, such as at a position in the data pointer table corresponding to the present sub-block of the data block being written. In block 324, the data storage controller 102 sets the reference count associated with the sub-block to one, to indicate that one pointer in the data pointer table 202 references the sub-block. In the illustrative embodiment, in block 326, the data storage controller 102 generates a back pointer that points to the entry (i.e., pointer) in the data pointer table that refers to the location in the deduplication data table 204 where the sub-block was written. The data storage controller 102 additionally writes the back pointer in the deduplication data table 204 in association with the sub-block that was written to the deduplication data table 204. In doing so, the data storage controller 102 may store the back pointer as an additional field in the deduplication data table 204 or in a separate data structure in the memory 116. By generating and storing the back pointer to the entry in the data pointer table, the data storage controller 102 can easily locate the beginning of a linked list of pointers in the data pointer table that refer to the sub-block in the deduplication data table 204. While only one pointer in the data pointer table 202 presently points to the sub-block, the following description of the operations performed by the data storage controller 102 when a match is found in block 314 explain the formation of a linked list of multiple pointers in the data pointer table that refer to the same sub-block.

Figure 4:
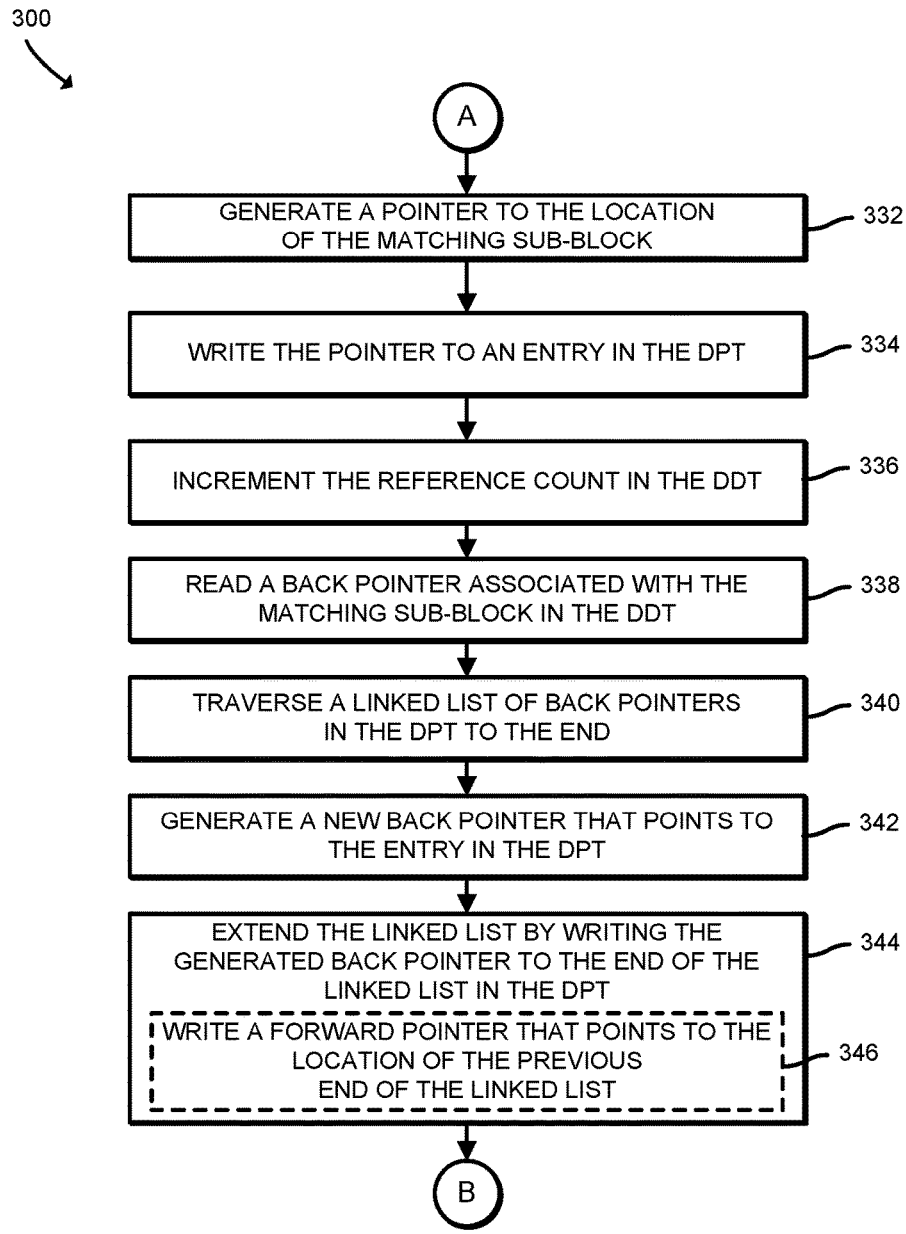

Referring back to block 314, if the data storage controller 102 determines that a match has been found, the method 300 advances to block 332 of FIG. 4. In block 332, the data storage controller 102 generates a pointer to the location of the matching sub-block that already exists in the deduplication data table 204. Further, the data storage controller 102 writes the pointer to an entry in the data pointer table 202, as indicated in block 334. In the illustrative embodiment, the data storage controller 102 writes the pointer at a location in the data pointer table 202 associated with the logical position of the present sub-block within the data block that is being written to the memory 116. For example, if the present sub-block is the first sub-block of the data block, the data storage controller 102 writes the pointer in the data pointer table 202 in an entry for the first sub-block of that data block. Further, the data storage controller 102 increments the reference count for the present sub-block in the deduplication data table 204, as indicated in block 336. In block 338, the data storage controller 102 reads an existing back pointer stored in association with the matching sub-block (i.e., the present sub-block) in the data pointer table. As described above, the back pointer provides the location in the data pointer table 202 of the first pointer that refers to the sub-block in the deduplication data table 204. The first pointer may simultaneously represent both the beginning and the end of the linked list if no other pointers in the data pointer table 202 have been added to the linked list. Otherwise, the data storage controller 102 may identify another back pointer that is stored in association with the first pointer in the linked list. The additional back pointer points to a subsequent pointer stored in the data pointer table 202 that also refers to the same sub-block. The data storage controller may traverse multiple such back pointers, each stored in association with a different pointer in the data pointer table 202 until the data storage controller 102 reaches the end of the linked list (i.e., no additional back pointers exist in the linked list). This process of traversing the linked list of back pointers is indicated in block 340.

In block 342, the data storage controller 102 generates a new back pointer that points to the pointer written to the data pointer table 202 in block 334. Further, as indicated in block 344, the data storage controller 102 extends the linked list by writing the generated back pointer to the end of the linked list in the data pointer table 202. Accordingly, the pointer stored during block 334 becomes the end of the linked list. As indicated in block 346, in the illustrative embodiment, the data storage controller 102 additionally writes a forward pointer that points to the location of the previous end of the linked list. The data storage controller 102 writes the forward pointer in association with the pointer stored during block 334. In other words, in the illustrative embodiment, the linked list is a doubly-linked list, which enables the data storage controller 102 to easily traverse the linked list in either direction.

Referring again to FIG. 3, regardless of whether the data storage controller 102 found a match or did not find a match in block 314, the data storage controller 102 determines, in block 330, whether more sub-blocks are to be written to the memory 116. For example, if the present sub-block was only the first sub-block of a larger block, the data storage controller 102 may determine that additional sub-blocks are to be stored. If so, the method 300 loops back to block 304 to obtain the next sub-block to write to the memory 116. Otherwise, the method 300 loops back to block 302 in which the data storage controller 102 awaits another write request.

Figure 5:
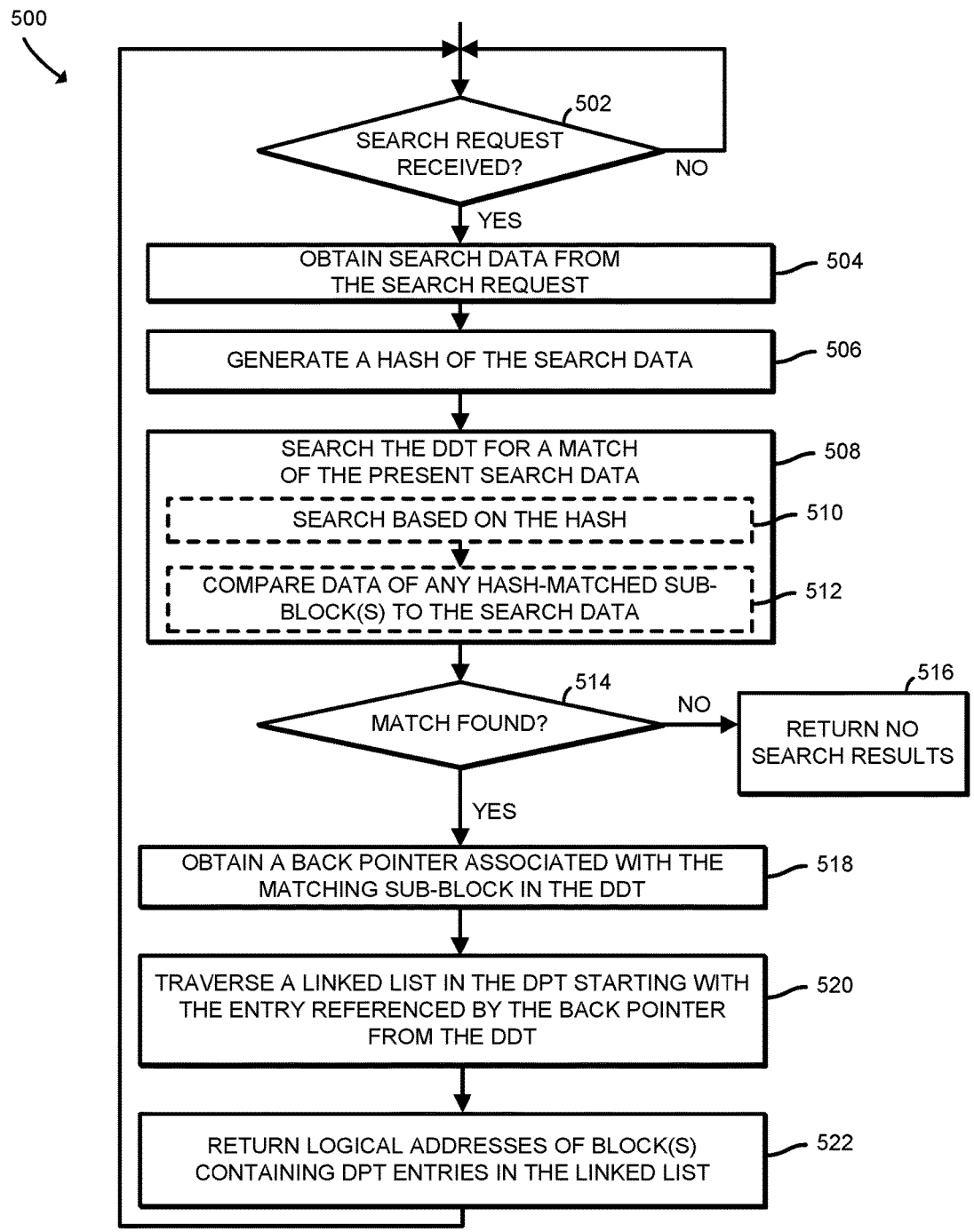
FIG. 5 is a simplified flow diagram of at least one embodiment of a method for searching for data that may be executed by the data storage device of FIGS. 1 and 2.

Referring now to FIG. 5, the data storage controller 102 of the data storage device 100 may execute a method 500 for performing a search operation. The search operation takes advantage of the data structures generated during the write operation described above to quickly find every pointer in the data pointer table 202 that references a particular sub-block in the deduplication data table 204. The method 500 begins with block 502, in which the data storage controller 102 determines whether a search request has been received, such as from the host 280. After the data storage controller 102 receives a search request, the method 300 advances to block 504 in which the data storage controller 102 obtains search data from the search request. In the illustrative embodiment, the search data is a portion of a file, such as a sub-block. In block 506, the data storage controller 102 generates a hash of the search data. This operation is similar to the process of generating a hash of a sub-block to be written to the memory 116, as described with reference to block 306 of FIG. 3. In block 508, the data storage controller 102 searches the deduplication data table 204 for a match of the present search data. In doing so, in the illustrative embodiment, the data storage controller 102 searches the deduplication data table 204 based on the hash generated in block 506. Further, in the illustrative embodiment, the data storage controller 102 compares the actual data of any sub-blocks that initially appear as a potential match to the search data to determine whether a match exists (e.g., whether the compared data is equal). This process is similar to blocks 308 through 312 of the method 300, described with reference to FIG. 3.

In block 514, the data storage controller 102 determines whether a match has been found. If not, the data storage controller 102 returns no search results in response to the search request, as indicated in block 516. For example, the data storage controller 102 may return an indication, such as a numeric code, indicative of no search results. Referring back to block 514, if the data storage controller 102 instead determines that a match was found, the method advances to block 518. In block 518, the data storage controller 102 obtains a back pointer associated with the matching sub-block in the deduplication data table 204. In block 520, the data storage controller 102 traverses the linked list in the data pointer table 202, starting with the pointer in the data pointer table 202 that was pointed to by the back pointer obtained in block 518. In situations in which only one pointer in the data pointer table 202 references the sub-block, traversing the linked list entails locating that one pointer in the data pointer table 202 that was referenced by the back pointer stored in association with the sub-block in the deduplication data table 204. In other situations, in which multiple pointers in the data pointer table 202 reference the sub-block, the data storage controller 102 traverses the linked list by following the back pointers associated with each pointer in the linked list. As described above, each entry (i.e., pointer) in the data pointer table 202 is associated with a sub-block within a larger data block. Each data block has a logical address associated with it. In block 522, the data storage controller 102 returns the logical addresses of the blocks that contain entries (e.g., pointers) in the data pointer table 202 that are within the linked list that was traversed in block 520. In the illustrative embodiment, these logical addresses are the search results.

Figure 6:
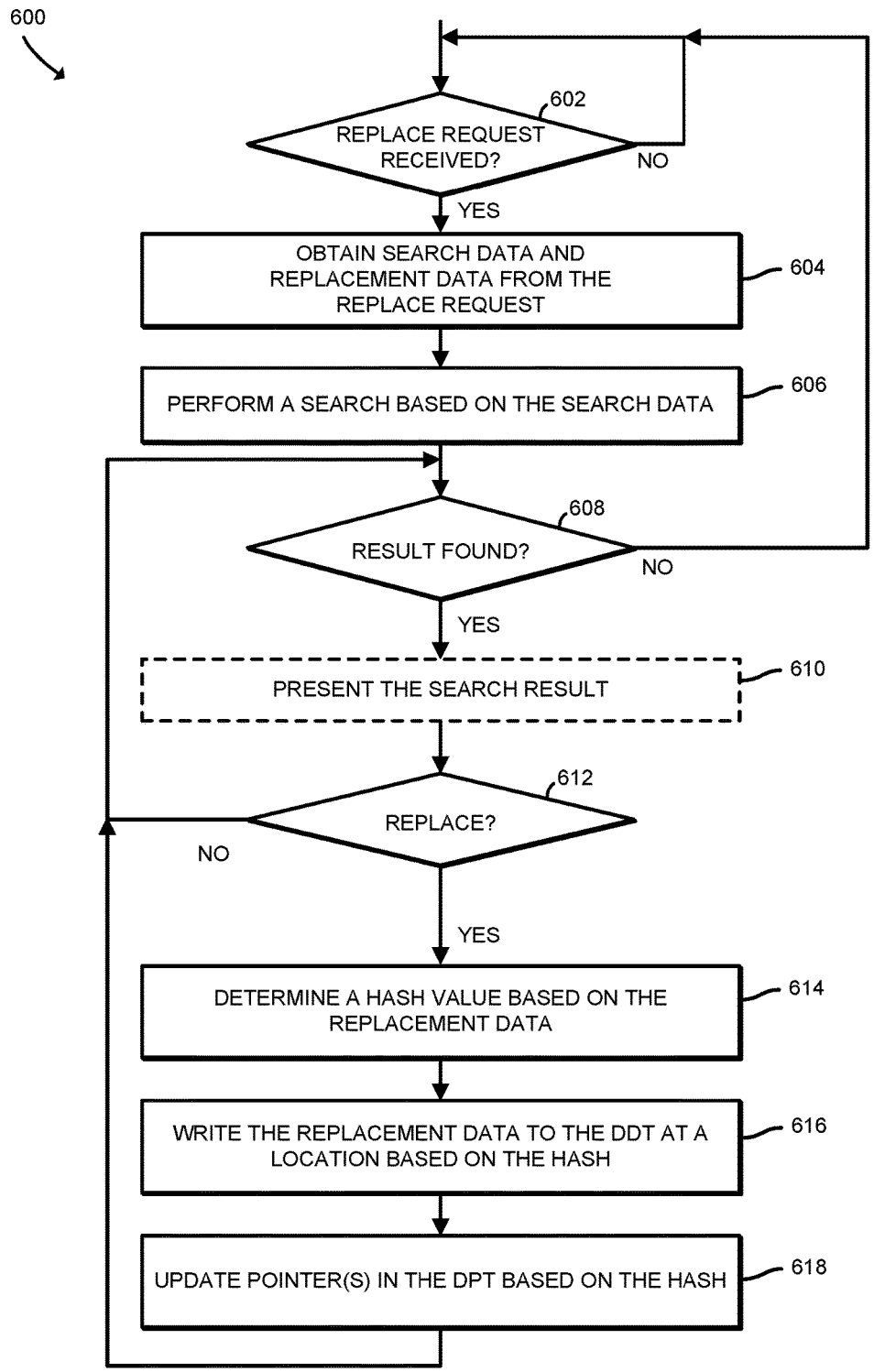
FIG. 6 is a simplified flow diagram of at least one embodiment of a method for replacing data that may be executed by the data storage device of FIGS. 1 and 2.

Referring now to FIG. 6, in use, the data storage controller 102 of the data storage device 100 may execute a method 600 for performing a replace operation. The method 600 begins with block 602 in which the data storage controller 102 determines whether a replace request has been received, such as from the host 280. After a replace request has been received, the method 600 advances to block 604 in which the data storage controller 102 obtains search data and replacement data. In block 606, the data storage controller 102 performs a search based on the search data. In doing so, in the illustrative embodiment, the data storage controller 102 performs the method 500, described with reference to FIG. 5. In block 608, the data storage controller 102 determines whether one or more search results were found in the search. If not, the method 600 loops back to block 602, in which the data storage controller 102 awaits another replace request. However, if the data storage controller 102 determines at block 608 that at least one search result was found, the data storage controller 102 may present one of the search results to the user, such as through a graphical user interface (not shown) to enable the user to review the surrounding content and determine whether to replace the search data with the replacement data for that search result.

In block 612, the data storage controller 102 determines whether to proceed with replacing the search data with the replacement data. In the illustrative embodiment, the data storage controller 102 receives a response from the user, such as through the graphical user interface, of whether to proceed with replacing the search data with the replacement data in the search result. If the data storage controller 102 determines not to proceed with replacing the search data with the replacement data, the method 600 loops back to block 608 in which the data storage controller 102 determines whether another search result was found. Otherwise, the method 600 advances to block 614, in which the data storage controller 102 determines a hash value based on the replacement data. In block 616, the data storage controller 102 writes the replacement data to the deduplication data table 204 at a location that is based on the hash that was determined in block 614. As should be understood from the foregoing description, the search data and the replacement data are treated as sub-blocks in the above process. Further, given that the content of a sub-block affects its hash, which in turn affects the location where the sub-block is stored in the deduplication data table 204, the replacement data written to the deduplication data table 204 is likely stored in a different location in the deduplication data table 204 than the original search data. Accordingly, in block 618, the data storage controller 102 updates the corresponding pointers in the data pointer table to refer to the location of the replacement data in the deduplication data table 204, rather than the location of the search data and updates the linked list to reflect that the present entry in the data pointer table no longer points to the search data in the deduplication data table 204. Afterwards, the method 600 loops back to block 608 to determine whether an additional search result was found.

Figure 7:
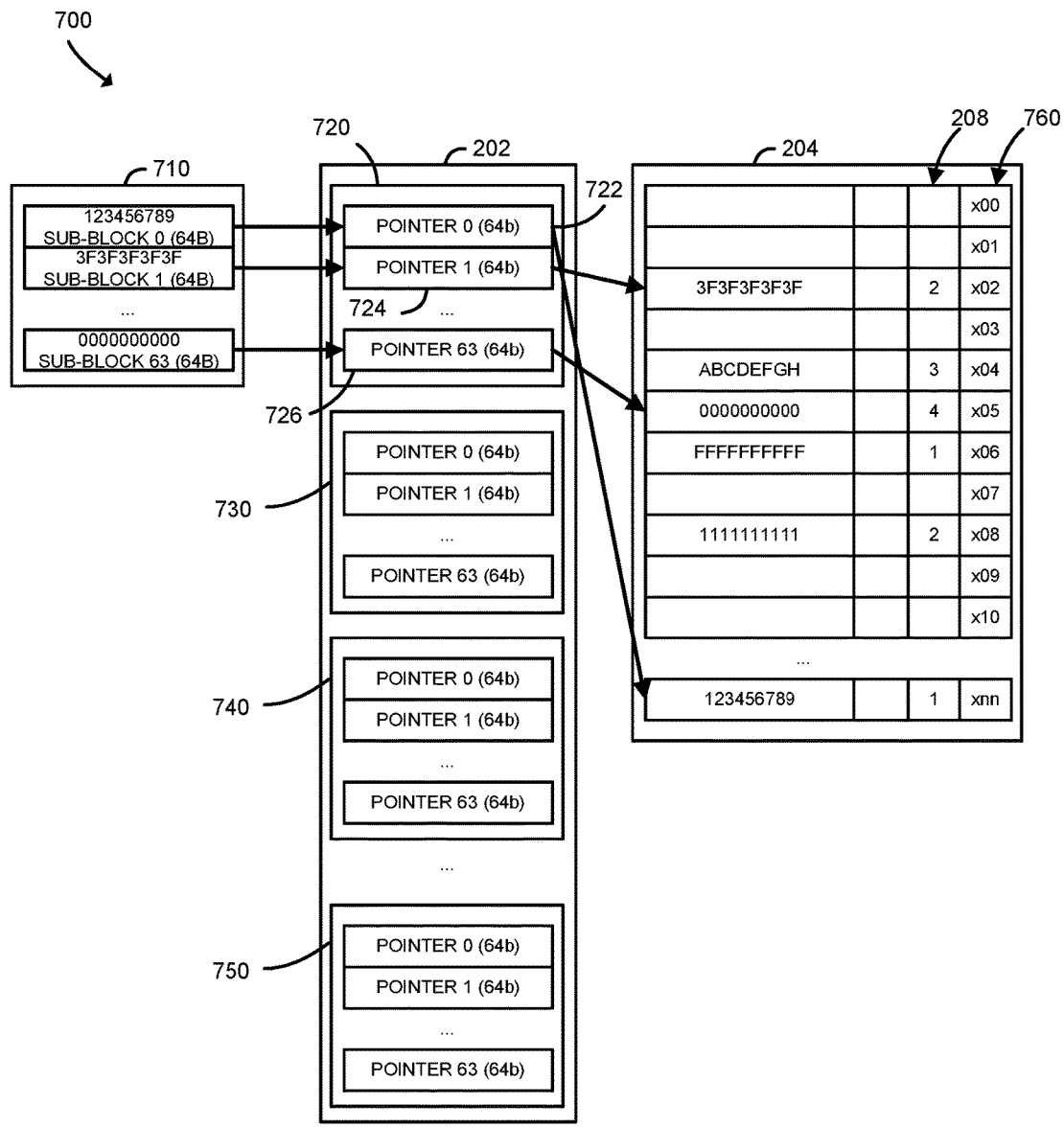
FIG. 7 is a simplified block diagram of at least one embodiment of the writing of data by the data storage device of FIGS. 1 and 2 in accordance with the method of FIGS. 3-4.

Referring now to FIG. 7, a block diagram 700 illustrates an embodiment of the writing of data by the data storage device 100. In the illustrative embodiment, the data storage controller 102 obtains a data block 710 to be written to the memory 116. The illustrative data block 710 includes a plurality of data sub-blocks. In the illustrative embodiment, the data block 710 includes 64 sub-blocks, each of which is 64 bytes. In other embodiments, the number of sub-blocks in a data block and the number of bytes of data in a sub-block may differ. The data pointer table 202, located in the memory 116, includes a set of entries (i.e., pointers) 722, 724, 726, each of which corresponds to a respective one of the sub-blocks of the data block 710. The data pointer table 202 additionally includes other sets of entries (i.e., pointers) 730, 740, 750 corresponding to other data blocks. Each entry (i.e., pointer) in the data pointer table 202 references a physical address 760 (i.e., a location) in the deduplication data table 204 where a sub-block is stored. Additionally, the data storage controller 102 sets and/or increments the reference count 208 associated with each sub-block stored in the deduplication data table 204.

Figure 8:
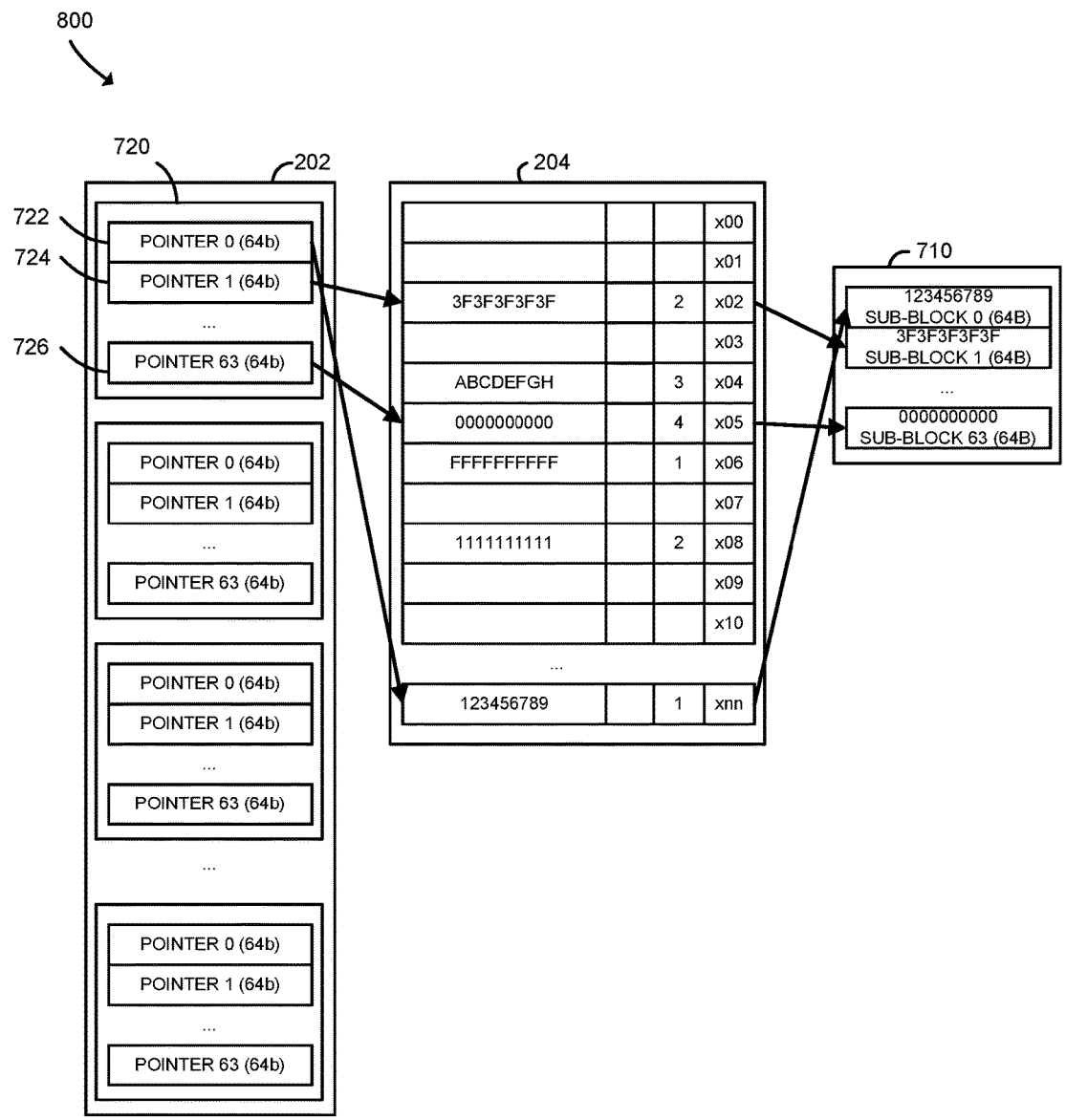
FIG. 8 is a simplified block diagram of at least one embodiment of the reconstruction of data by the data storage device of FIGS. 1 and 2 in response to a read instruction.

Referring now to FIG. 8, a block diagram 800 illustrates an embodiment of the reconstruction of data by the data storage device 100, such as in response to a read request from the host 280. In order to read a data block (e.g., data block 710), the data storage controller 102 accesses the set 720 of pointers in the data pointer table 202 associated with the data block to be read. The data storage controller 102 sequentially reads each pointer in the set 720, reads the sub-block stored at the location referenced by the pointers, and combines the read sub-blocks to form the data block 710.

Figure 9:
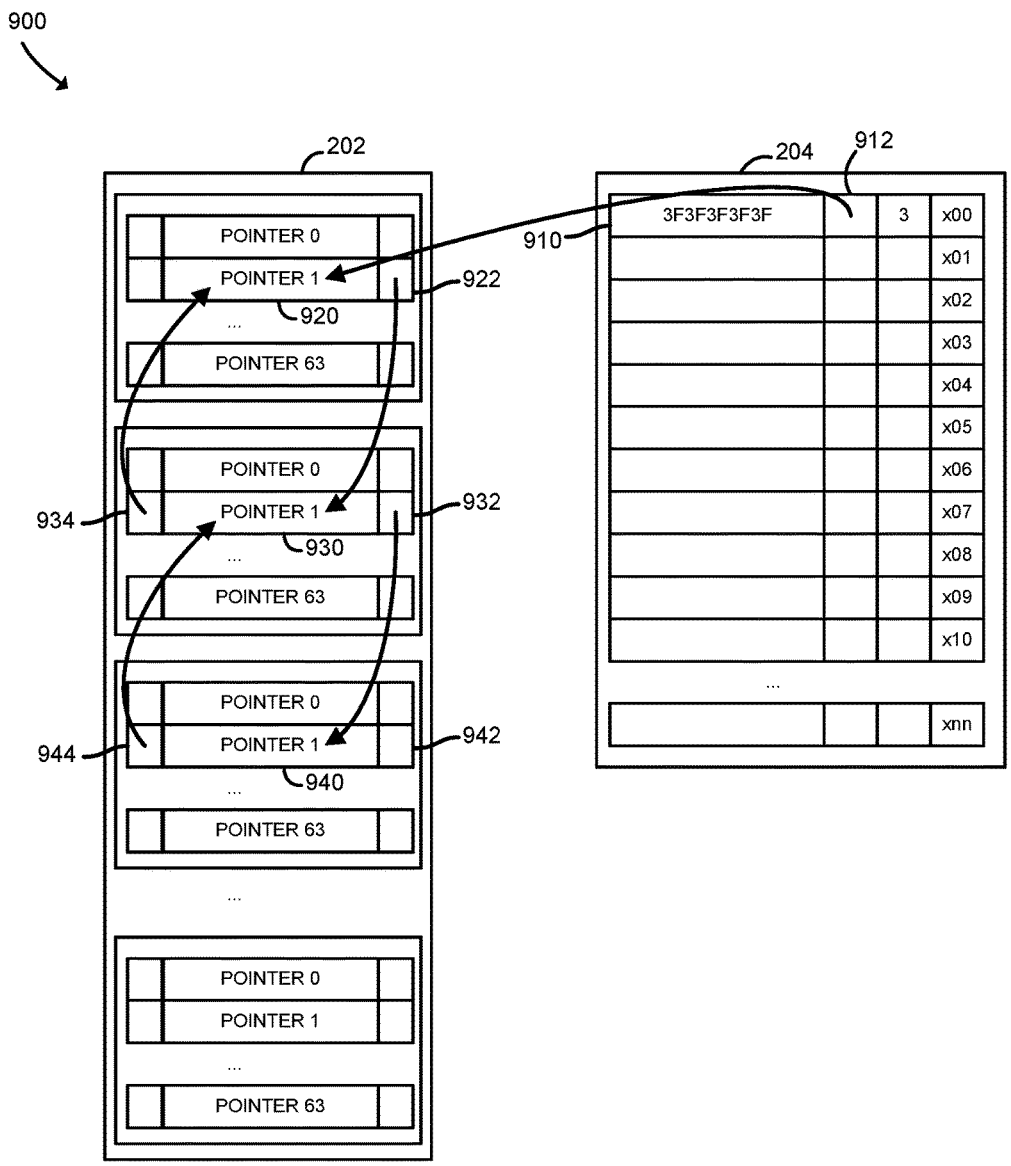
FIG. 9 is a simplified block diagram of at least one embodiment of a linked list of pointers generated by the data storage device of FIGS. 1 and 2 for use in searching for data.

Referring now to FIG. 9, a block diagram 900 illustrates an embodiment of a linked list of pointers that may be generated by the data storage controller 102 when writing data and traversed by the data storage controller 102 when searching for data. A sub-block 910 in the deduplication data table 204 is associated with a back pointer 912 that provides the address of a pointer 920 in the data pointer table 202. The pointer 920 references the sub-block 910. A back pointer 922 stored in association with the pointer 920 references another pointer 930 in the data pointer table. The pointer 930 references the same sub-block 910 as the pointer 920. A back pointer 932 stored in association with the pointer 930 references another pointer 940 in the data pointer table 202. The pointer 940 also references the sub-block 910. Accordingly, in the data pointer table 202, three pointers 920, 930, and 940 reference the sub-block 910 in the deduplication data table 204. In the illustrative embodiment, a null back pointer 942 (i.e., a pointer having a value of zero or null) is stored in association with the pointer 940 to indicate the end of the linked list. Accordingly, in the illustrative embodiment, in response to a search request, the data storage controller 102 may locate the sub-block 910 in the deduplication data table 204, follow the back pointer 912 to the pointer 920, then traverse the back pointers 922 and 932 to identify the pointers in the data pointer table, and their associated data blocks, that include the search data (i.e., the sub-block 910). Additionally, in the illustrative embodiment, the linked list is a double-linked list, such that each of the pointers 940, 930, and 920 may be traversed in reverse order by following forward pointers 944 and 934. This is advantageous in enabling the data storage controller 102 to more quickly traverse the list in either direction and make changes, such as deletions and/or substitutions of pointers in the linked list.

Figure 10:
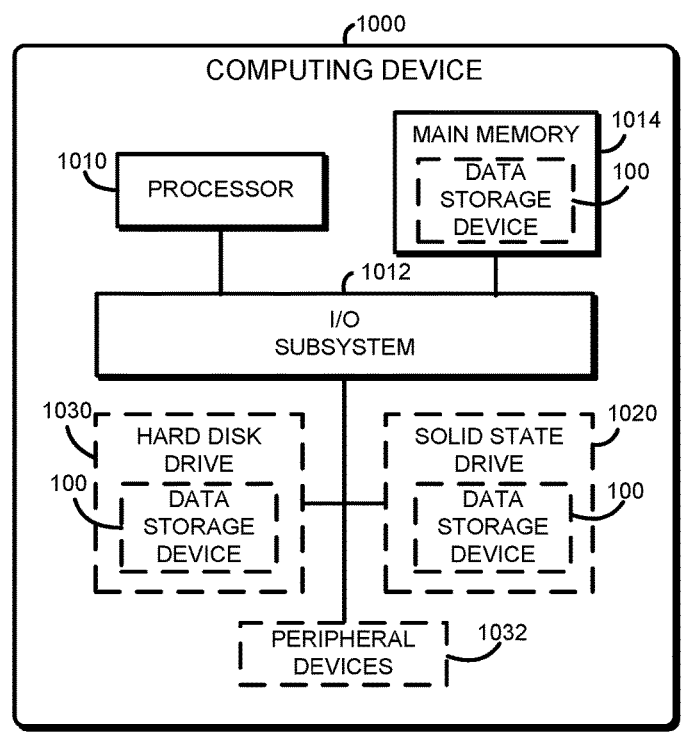
FIG. 10 is a simplified block diagram of at least one embodiment of a computing device including the data storage device of FIGS. 1 and 2.

Referring now to FIG. 10, in some embodiments, the data storage device 100 may be incorporated in, or form a portion of, a computing device 1000. The computing device 1000 may be embodied as any type of computing device in which the data storage device 100 may be used. For example, the computing device 1000 may be embodied as a smart phone, a tablet computer, a notebook, a laptop computer, a netbook, an Ultrabook™, a wearable computing device, a pair of smart glasses, a head-mounted computing device, a cellular phone, a desktop computer, a smart device, a personal digital assistant, a mobile Internet device, a server, a data storage device, and/or any other computing/communication device. As shown in FIG. 10, the illustrative computing device 1000 includes a processor 1010, an input/output ("I/O") subsystem 1012, and a main memory 1014. Of course, the computing device 1000 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 1014, or portions thereof, may be incorporated in the processor 1010 in some embodiments.

The processor 1010 may be embodied as any type of processor capable of performing the functions described herein. For example, the processor 1010 may be embodied as a single or multi-core processor(s), digital signal processor, microcontroller, or other processor or processing/controlling circuit. Similarly, the memory 1014 may be embodied as any type of volatile or non-volatile memory or data storage capable of performing the functions described herein. In operation, the memory 1014 may store various data and software used during operation of the computing device 1000 such as operating systems, applications, programs, libraries, and drivers. The memory 1014 is communicatively coupled to the processor 1010 via the I/O subsystem 1012, which may be embodied as circuitry and/or components to facilitate input/output operations with the processor 1010, the memory 1014, and other components of the computing device 1000. For example, the I/O subsystem 1012 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

As shown in FIG. 10, the data storage device 100 may be incorporated in, or form a portion of, one or more other components of the computing device 1000. For example, the data storage device 100 may be embodied as, or otherwise be included in, the main memory 1014. Additionally or alternatively, the data storage device 100 may be embodied as, or otherwise included in, a solid state drive 1020 of the computing device 1000. Further, in some embodiments, the data storage device 100 may be embodied as, or otherwise included in, a hard disk drive 1030 of the computing device 1000. Of course, in other embodiments, the data storage device 100 may be included in or form a portion of other components of the computing device 1000.

Reference to memory devices can apply to different memory types, and in particular, any memory that has a bank group architecture. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WI02 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device.

EXAMPLES

Illustrative examples of the technologies disclosed herein are provided below. An embodiment of the technologies may include any one or more, and any combination of, the examples described below.

Example 1 includes an apparatus comprising a memory to store (i) sub-blocks of data in a data table and (ii) a pointer table of locations of the sub-blocks in the data table; and a controller to manage the storage and lookup of data in the memory, wherein the controller is to store a sub-block pointer in the pointer table to a location of a sub-block in the data table; and store a second pointer that references an entry where the sub-block pointer is stored in the pointer table.

Example 2 includes the subject matter of Example 1, and wherein the sub-block is a first sub-block, the entry is a first entry, and the controller is further to determine whether a second sub-block to be written to the data table matches the first sub-block; and store, in response to a determination that the second sub-block matches the first sub-block, (i) the sub-block pointer in the pointer table in a second entry and (ii) a third pointer in association with the first entry, wherein the third pointer is to reference the second entry.

Example 3 includes the subject matter of any of Examples 1 and 2, and wherein the controller is further to store, in response to the determination that the second sub-block matches the first sub-block, a fourth pointer in association with the second entry, wherein the fourth pointer references the first entry.

Example 4 includes the subject matter of any of Examples 1-3, and wherein the controller is further to obtain a third sub-block to be written to the data table; determine whether the third sub-block matches the first sub-block; and store, in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

Example 5 includes the subject matter of any of Examples 1-4, and wherein the controller is further to generate a hash of the obtained sub-block; and search the memory for a match of the obtained sub-block, and wherein to store the sub-block at a location in the data table comprises to store the sub-block at a location in the data table in response to a determination that the memory does not include a match for the sub-block.

Example 6 includes the subject matter of any of Examples 1-5, and wherein to search the memory for a match of the obtained sub-block comprises to identify one or more locations in the data table associated with the hash; and compare data stored at each of the one or more locations to the sub-block to determine whether the data stored at each location matches the data of the sub-block.

Example 7 includes the subject matter of any of Examples 1-6, and wherein the controller is further to obtain search data to locate in the memory; search the data table for a sub-block that matches the search data; determine, in response to an identification of a sub-block that matches the search data, a third pointer to an entry in the pointer table, wherein a sub-block pointer to the sub-block is stored; determine a logical address of a block associated with the sub-block pointer; and add the logical address to a search result set.

Example 8 includes the subject matter of any of Examples 1-7, and wherein the entry is a first entry and the controller is further to identify a fourth pointer stored in association with the first entry in the pointer table, wherein the fourth pointer is to reference a second entry in the pointer table wherein a second sub-block pointer to the sub-block is stored; determine a second logical address of a second block, wherein the second block is associated with the second sub-block pointer; and add the second logical address to the search result set.

Example 9 includes the subject matter of any of Examples 1-8, and wherein the controller is further to obtain search data; identify a sub-block in the data table, wherein the sub-block matches the search data; identify a sub-block pointer in the pointer table, wherein the sub-block pointer is to point to a location of the sub-block in the data table; and traverse a linked list of additional sub-block pointers in the pointer table, wherein each sub-block pointer in the linked list is to point to the sub-block.

Example 10 includes the subject matter of any of Examples 1-9, and wherein the linked list is a doubly-linked linked list of pointers.

Example 11 includes the subject matter of any of Examples 1-10, and wherein the controller is further to obtain replacement data; generate a hash as a function of the replacement data; and write the replacement data to the data table at a replacement location determined as a function of the hash.

Example 12 includes the subject matter of any of Examples 1-11, and wherein the controller is further to traverse the linked list and update the sub-block pointers to point to the replacement location.

Example 13 includes the subject matter of any of Examples 1-12, and wherein the controller is further to set a reference count associated with a location in the data table in response to storage of the sub-block.

Example 14 includes the subject matter of any of Examples 1-13, and wherein to obtain the sub-block of the block comprises to obtain a 64 byte sub-block of a 4 kilobyte block.

Example 15 includes the subject matter of any of Examples 1-14, and wherein to store a sub-block pointer in the pointer table comprises to store a 64 bit sub-block pointer.

Example 16 includes the subject matter of any of Examples 1-15, and wherein the memory includes a plurality of non-volatile memory devices.

Example 17 includes the subject matter of any of Examples 1-16, and wherein the memory includes a plurality of byte-addressable write-in-place memory devices.

Example 18 includes the subject matter of any of Examples 1-17, and furthering including one or more of at least one processor communicatively coupled to the memory, a network interface communicatively coupled to a processor, a display communicatively coupled to a processor, or a battery coupled to the apparatus.

Example 19 includes a method comprising storing, by a controller of an apparatus, a sub-block pointer in a pointer table to a location of the sub-block in a data table; and storing, by the controller, a second pointer that references an entry where the sub-block pointer is stored in the pointer table.

Example 20 includes the subject matter of Example 19, and wherein the sub-block is a first sub-block and the entry is a first entry, the method furthering including determining, by the controller, whether a second sub-block to be written to the data table matches the first sub-block; and storing, by the controller and in response to a determination that the second sub-block matches the first sub-block, (i) the sub-block pointer in the pointer table in a second entry and (ii) a third pointer in association with the first entry, wherein the third pointer is to reference the second entry.

Example 21 includes the subject matter of any of Examples 19 and 20, and furthering including storing, by the controller and in response to the determination that the second sub-block matches the first sub-block, a fourth pointer in association with the second entry, wherein the fourth pointer references the first entry.

Example 22 includes the subject matter of any of Examples 19-21, and furthering including obtaining, by the controller, a third sub-block to be written to the data table; determining, by the controller, whether the third sub-block matches the first sub-block; and storing, by the controller and in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

Example 23 includes the subject matter of any of Examples 19-22, and furthering including generating, by the controller, a hash of the obtained sub-block; and searching, by the controller, the memory for a match of the obtained sub-block, wherein storing the sub-block at a location in the data table comprises storing the sub-block at a location in the data table in response to a determination that the memory does not include a match for the sub-block.

Example 24 includes the subject matter of any of Examples 19-23, and wherein searching the memory for a match of the obtained sub-block comprises identifying one or more locations in the data table associated with the hash; and comparing data stored at each of the one or more locations to the sub-block to determine whether the data stored at each location matches the data of the sub-block.

Example 25 includes the subject matter of any of Examples 19-24, and furthering including obtaining, by the controller, search data to locate in the memory; searching, by the controller, the data table for a sub-block that matches the search data; determining, by the controller and in response to an identification of a sub-block that matches the search data, a third pointer to an entry in the pointer table, wherein a sub-block pointer to the sub-block is stored; determining, by the controller, a logical address of a block associated with the sub-block pointer; and adding, by the controller, the logical address to a search result set.

Example 26 includes the subject matter of any of Examples 19-25, and wherein the entry is a first entry, the method furthering including identifying, by the controller, a fourth pointer stored in association with the first entry in the pointer table, wherein the fourth pointer is to reference a second entry in the pointer table wherein a second sub-block pointer to the sub-block is stored; determining, by the controller, a second logical address of a second block, wherein the second block is associated with the second sub-block pointer; and adding, by the controller, the second logical address to the search result set.

Example 27 includes the subject matter of any of Examples 19-26, and furthering including obtaining, by the controller, search data; identifying, by the controller, a sub-block in the data table, wherein the sub-block matches the search data; identifying, by the controller, a sub-block pointer in the pointer table, wherein the sub-block pointer is to point to a location of the sub-block in the data table; and traversing, by the controller, a linked list of additional sub-block pointers in the pointer table, wherein each sub-block pointer in the linked list is to point to the sub-block.

Example 28 includes the subject matter of any of Examples 19-27, and wherein the linked list is a doubly-linked linked list of pointers.

Example 29 includes the subject matter of any of Examples 19-28, and furthering including obtaining, by the controller, replacement data; generating, by the controller, a hash as a function of the replacement data; and writing, by the controller, the replacement data to the data table at a replacement location determined as a function of the hash.

Example 30 includes the subject matter of any of Examples 19-29, and furthering including traversing, by the controller, the linked list; and updating, by the controller, the sub-block pointers to point to the replacement location.

Example 31 includes the subject matter of any of Examples 19-30, and furthering including setting, by the controller, a reference count associated with a location in the data table in response to storage of the sub-block.

Example 32 includes the subject matter of any of Examples 19-31, and wherein obtaining the sub-block of the block comprises obtaining a 64 byte sub-block of a 4 kilobyte block.

Example 33 includes the subject matter of any of Examples 19-32, and wherein storing a sub-block pointer in the pointer table comprises storing a 64 bit sub-block pointer.

Example 34 includes one or more machine-readable storage media comprising a plurality of instructions stored thereon that, when executed, cause an apparatus to perform the method of any of Examples 19-33.

Example 35 includes the subject matter of Example 34, and an apparatus comprising means for storing a sub-block pointer in a pointer table to a location of the sub-block in a data table; and means for storing a second pointer that references an entry where the sub-block pointer is stored in the pointer table.

Example 36 includes the subject matter of any of Examples 34 and 35, and wherein the sub-block is a first sub-block and the entry is a first entry, the apparatus furthering including means for determining whether a second sub-block to be written to the data table matches the first sub-block; and means for storing, in response to a determination that the second sub-block matches the first sub-block, (i) the sub-block pointer in the pointer table in a second entry and (ii) a third pointer in association with the first entry, wherein the third pointer is to reference the second entry.

Example 37 includes the subject matter of any of Examples 34-36, and furthering including means for storing, in response to the determination that the second sub-block matches the first sub-block, a fourth pointer in association with the second entry, wherein the fourth pointer references the first entry.

Example 38 includes the subject matter of any of Examples 34-37, and furthering including means for obtaining a third sub-block to be written to the data table; means for determining whether the third sub-block matches the first sub-block; and means for storing, in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

Example 39 includes the subject matter of any of Examples 34-38, and furthering including means for generating a hash of the obtained sub-block; and means for searching the memory for a match of the obtained sub-block, wherein the means for storing the sub-block at a location in the data table comprises means for storing the sub-block at a location in the data table in response to a determination that the memory does not include a match for the sub-block.

Example 40 includes the subject matter of any of Examples 34-39, and wherein the means for searching the memory for a match of the obtained sub-block comprises means for identifying one or more locations in the data table associated with the hash; and means for comparing data stored at each of the one or more locations to the sub-block to determine whether the data stored at each location matches the data of the sub-block.

Example 41 includes the subject matter of any of Examples 34-40, and furthering including means for obtaining search data to locate in the memory; means for searching the data table for a sub-block that matches the search data; means for determining, in response to an identification of a sub-block that matches the search data, a third pointer to an entry in the pointer table, wherein a sub-block pointer to the sub-block is stored; means for determining a logical address of a block associated with the sub-block pointer; and means for adding the logical address to a search result set.

Example 42 includes the subject matter of any of Examples 34-41, and wherein the entry is a first entry, the apparatus furthering including means for identifying a fourth pointer stored in association with the first entry in the pointer table, wherein the fourth pointer is to reference a second entry in the pointer table wherein a second sub-block pointer to the sub-block is stored; means for determining a second logical address of a second block, wherein the second block is associated with the second sub-block pointer; and means for adding the second logical address to the search result set.

Example 43 includes the subject matter of any of Examples 34-42, and furthering including means for obtaining search data; means for identifying a sub-block in the data table, wherein the sub-block matches the search data; means for identifying a sub-block pointer in the pointer table, wherein the sub-block pointer is to point to a location of the sub-block in the data table; and means for traversing a linked list of additional sub-block pointers in the pointer table, wherein each sub-block pointer in the linked list is to point to the sub-block.

Example 44 includes the subject matter of any of Examples 34-43, and wherein the linked list is a doubly-linked linked list of pointers.

Example 45 includes the subject matter of any of Examples 34-44, and furthering including means for obtaining replacement data; means for generating a hash as a function of the replacement data; and means for writing the replacement data to the data table at a replacement location determined as a function of the hash.

Example 46 includes the subject matter of any of Examples 34-45, and furthering including means for traversing the linked list; and means for updating the sub-block pointers to point to the replacement location.

Example 47 includes the subject matter of any of Examples 34-46, and furthering including means for setting a reference count associated with a location in the data table in response to storage of the sub-block.

Example 48 includes the subject matter of any of Examples 34-47, and wherein the means for obtaining the sub-block of the block comprises means for obtaining a 64 byte sub-block of a 4 kilobyte block.

Example 49 includes the subject matter of any of Examples 34-48, and wherein the means for storing a sub-block pointer in the pointer table comprises means for storing a 64 bit sub-block pointer.

The invention claimed is:

1. An apparatus comprising:
   a controller configured to:
   store, in a pointer table in a memory, a sub-block pointer indicative of a location of a first sub-block in a data table;
   store, in the data table and in association with the first sub-block, a second pointer that references a first entry where the sub-block pointer is stored in the pointer table;
   determine whether a second sub-block to be written to the data table matches the first sub-block;

store, in response to a determination that the second sub-block matches the first sub-block, (i) the sub-block pointer in the pointer table in a second entry and (ii) a third pointer in association with the first entry, wherein the third pointer is to reference the second entry; and store, in response to the determination that the second sub-block matches the first sub-block, a fourth pointer in association with the second entry, wherein the fourth pointer references the first entry.

2. The apparatus of claim 1, wherein the controller is further configured to:
obtain a third sub-block to be written to the data table;
determine whether the third sub-block matches the first sub-block; and
store, in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

3. The apparatus of claim 1, wherein the controller is further configured to:
obtain the first sub-block, wherein the first sub-block is to be written to the data table;
generate a hash of the obtained first sub-block;
search the memory for a match of the obtained first sub-block; and
store the obtained first sub-block at a location in the data table in response to a determination that the memory does not include a match for the obtained first sub-block.

4. The apparatus of claim 3, wherein to search the memory for a match of the obtained first sub-block comprises to:
identify one or more locations in the data table associated with the hash; and
compare data stored at each of the one or more locations to the obtained first sub-block to determine whether the data stored at each location matches the data of the obtained first sub-block.

5. The apparatus of claim 1, wherein the controller is further configured to:
obtain search data to locate in the memory;
search the data table for a sub-block that matches the search data;
determine, in response to an identification of a sub-block that matches the search data, a pointer to the first entry in the pointer table, wherein the sub-block pointer to the sub-block is stored;
determine a logical address of a block associated with the sub-block pointer; and
add the logical address to a search result set.

6. The apparatus of claim 1, wherein the controller is further configured to:
obtain search data;
identify a target sub-block in the data table, wherein the target sub-block matches the search data;
identify a target sub-block pointer in the pointer table, wherein the target sub-block pointer is to point to a location of the target sub-block in the data table; and
traverse a linked list of additional sub-block pointers in the pointer table, wherein each sub-block pointer in the linked list is to point to the target sub-block.

7. The apparatus of claim 6, wherein the linked list is a doubly-linked linked list of pointers.

8. The apparatus of claim 6, wherein the controller is further configured to:
obtain replacement data;
generate a hash as a function of the replacement data; and
write the replacement data to the data table at a replacement location determined as a function of the hash.

9. The apparatus of claim 8, wherein the controller is further configured to traverse the linked list and update the sub-block pointers to point to the replacement location.

10. The apparatus of claim 1, wherein the controller is further configured to set a reference count associated with the location in the data table in response to storage of the sub-block pointer.

11. The apparatus of claim 1, further comprising one or more of:
at least one processor communicatively coupled to the memory,
a network interface communicatively coupled to a processor,
a display communicatively coupled to a processor, or
a battery coupled to the apparatus.

12. One or more non-transitory machine-readable storage media comprising a plurality of instructions stored thereon that, when executed, cause an apparatus to:
store, in a pointer table of a memory, a sub-block pointer indicative of a location of a first sub-block in a data table; and
store, in the data table and in association with the first sub-block, a second pointer that references a first entry where the sub-block pointer is stored in the pointer table;
determine whether a second sub-block to be written to the data table matches the first sub-block;
store, in response to a determination that the second sub-block matches the first sub-block, (i) the sub-block pointer in the pointer table in a second entry and (ii) a third pointer in association with the first entry, wherein the third pointer is to reference the second entry; and
store, in response to the determination that the second sub-block matches the first sub-block, a fourth pointer in association with the second entry, wherein the fourth pointer references the first entry.

13. The one or more non-transitory machine-readable storage media of claim 12, wherein the plurality of instructions, when executed, further cause the apparatus to:
obtain a third sub-block to be written to the data table;
determine whether the third sub-block matches the first sub-block; and
store, in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

14. The one or more non-transitory machine-readable storage media of claim 12, wherein the plurality of instructions, when executed, further cause the apparatus to:
obtain the first sub-block, wherein the first sub-block is to be written to the data table;
generate a hash of the obtained first sub-block;
search the memory for a match of the obtained first sub-block; and store the obtained first sub-block at a location in the data table in response to a determination that the memory does not include a match for the obtained first sub-block.

15. The one or more non-transitory machine-readable storage media of claim 14, wherein to search the memory for a match of the obtained first sub-block comprises to:
identify one or more locations in the data table associated with the hash; and
compare data stored at each of the one or more locations to the obtained first sub-block to determine whether the data stored at each location matches the data of the obtained first sub-block.

16. The one or more non-transitory machine-readable storage media of claim 12, wherein the plurality of instructions, when executed, further cause the apparatus to:
obtain search data to locate in the memory;
search the data table for a sub-block that matches the search data;
determine, in response to an identification of a sub-block that matches the search data, a pointer to the first entry in the pointer table, wherein the sub-block pointer to the sub-block is stored;
determine a logical address of a block associated with the sub-block pointer; and
add the logical address to a search result set.

17. A method comprising:
storing, by a controller of an apparatus and in a pointer table, a sub-block pointer indicative of a location of a first sub-block in a data table;
storing, by the controller and in the data table, in association with the first sub-block, a second pointer that references a first entry where the sub-block pointer is stored in the pointer table;
determining, by the controller, whether a second sub-block to be written to the data table matches the first sub-block;
storing, by the controller and in response to a determination that the second sub-block matches the first sub-block, (i) the sub-block pointer in the pointer table in a second entry and (ii) a third pointer in association with the first entry, wherein the third pointer is to reference the second entry; and
storing, by the controller and in response to the determination that the second sub-block matches the first sub-block, a fourth pointer in association with the second entry, wherein the fourth pointer references the first entry.

18. The method of claim 17, further comprising:
obtaining, by the controller, a third sub-block to be written to the data table;
determining, by the controller, whether the third sub-block matches the first sub-block; and
storing, by the controller and in response to a determination that the third sub-block matches the first sub-block, (i) the sub-block pointer in the pointer table in a third entry and (ii) a fifth pointer in association with the second entry, wherein the fifth pointer is to reference the third entry, and (iii) a sixth pointer in association with the third entry, wherein the sixth pointer is to reference the second entry.

* * * * *